US008543820B2

United States Patent
Minematsu

(10) Patent No.: US 8,543,820 B2
(45) Date of Patent: Sep. 24, 2013

(54) TAG GENERATION APPARATUS, TAG VERIFICATION APPARATUS, COMMUNICATION SYSTEM, TAG GENERATION METHOD, TAG VERIFICATION METHOD, AND RECORDING MEDIUM

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 31 days.

(21) Appl. No.: 13/319,636

(22) PCT Filed: Apr. 26, 2010

(86) PCT No.: PCT/JP2010/057349
§ 371 (c)(1),
(2), (4) Date: Nov. 9, 2011

(87) PCT Pub. No.: WO2010/131563
PCT Pub. Date: Nov. 18, 2010

(65) Prior Publication Data
US 2012/0057702 A1  Mar. 8, 2012

(30) Foreign Application Priority Data

May 11, 2009 (JP) ................................ 2009-114504

(51) Int. Cl.
*H04L 9/32* (2006.01)
(52) U.S. Cl.
USPC ............................ 713/170; 380/255; 713/181
(58) Field of Classification Search
USPC ................. 713/168–170, 176, 181; 380/255, 380/28–30, 37, 44
See application file for complete search history.

(56) References Cited

U.S. PATENT DOCUMENTS

| 5,757,913 | A | 5/1998 | Bellare et al. |
| 7,856,102 | B2 * | 12/2010 | Hatakeyama .................. 380/37 |
| 2003/0041242 | A1 * | 2/2003 | Patel ............................ 713/170 |
| 2003/0145203 | A1 * | 7/2003 | Audebert et al. ............. 713/169 |
| 2007/0113083 | A1 * | 5/2007 | Volkovs et al. .............. 713/168 |
| 2009/0138710 | A1 * | 5/2009 | Minematsu ................... 713/170 |

FOREIGN PATENT DOCUMENTS

| JP | 2-273779 A | 11/1990 |
| JP | 8-95994 A | 4/1998 |
| JP | 11-27254 A | 1/1999 |
| JP | 3123916 B | 1/2001 |

(Continued)

OTHER PUBLICATIONS

International Search Report for PCT/JP2010/057349 mailed Jul. 6, 2010.

(Continued)

*Primary Examiner* — Nirav B Patel

(57) ABSTRACT

The tag generation apparatus of the present invention includes a hash unit (12) that applies a hash function to a message to generate a hash value, a random number encryption unit (14) that applies an encryption function having a first key to a random number that is independent of the message to generate a first intermediate variable, a masked encryption unit (15) that applies the encryption function having a second key to the sum of the random number and the hash value to generate a second intermediate variable, and a tag generation unit (16) that generates as the tag a value contained in bits of a predetermined number of bits that is less than or equal to the number of bits of the random number and that are extracted from the exclusive OR of the first intermediate variable and the second intermediate variable.

18 Claims, 8 Drawing Sheets

(56) References Cited

FOREIGN PATENT DOCUMENTS

| JP | 2001202014 A | 7/2001 |
|----|--------------|--------|
| JP | 2005348306 A | 12/2005 |
| JP | 2007316108 A | 12/2007 |
| WO | 2008105343 A | 9/2008 |

OTHER PUBLICATIONS

M. Bellare et al. "Stateless evaluation of pseudorandom functions: Security beyond the birthday barrier". Advances in Cryptology-CRYPTO '99, 19th Annual International Cryptology Conference. Proceedings. Lecture Notes in Computer Science 1666, Springer, 1999, pp. 270-287.

Y. Dodis et al, "Improving the Security of MACs Via Randomized Message Preprocessing". Fast Software Encryption, 14th International Workshop, FSE 2007, Revised Selected Papers. Lecture Notes in Computer Science 4693, Springer, 2007, pp. 414-433.

D. J. Bernstein, "Stronger Security Bounds for Wegman-Carter-Shoup authenticators", Advances in Cryptology-EUROCRYPT '05, LNCS 3494, 2005.

K. Yasuda, "A One-Pass Mode of Operation for Deterministic Message Authentication—Security beyond the Birthday Barrier", Fast Software Encryption. FSE '08, LNCS 5086. 2006, pp. 314-330.

S. Halevi et al., "MMH: Software Message Authentication in the Gbit/second Rates", Fast Software Encryption, 4th International Workshop, FSE '97, Lecture Notes in Computer Science, vol. 1267, 1997.

P. Rogaway, "Effident Instantiations of Tweakable Blockciphers and Refinements to Modes OCB and PMAC", Advances in Cryptology-ASIACRYPT '04, LNCS 3329, 2004.

M. Bellare et al "Keyed Hash Functions and Message Authentication", Proceedings of Crypto '96, LNCS 1109, 1996, pp,1-15.

\* cited by examiner

TAG GENERATION APPARATUS, TAG VERIFICATION APPARATUS, COMMUNICATION SYSTEM, TAG GENERATION METHOD, TAG VERIFICATION METHOD, AND RECORDING MEDIUM

TECHNICAL FIELD

The present invention relates to a tag generation apparatus, a tag verification apparatus, a communication system, a tag generation method, a tag verification method, and a recording medium on which a program is recorded.

BACKGROUND ART

Message Authentication (Message Authentication Code (MAC)) is a technology in which a particular party that knows secret key K appends a tag T, that can be computed by using secret key K, to message M that is to be transmitted to ensure the validity of the message.

For example, when a sender has transmitted message M and tag T to a receiver in communication between two parties that share secret key K, the tag is computed from the message that was received on the receiver side and the tag that was computed is then compared with the tag that was received. If, as a result of comparison, the tag that was computed matches the tag that was received, message M can be judged to be a message sent from a legitimate sender. On the other hand, if the tag that was computed does not match the tag that was received, the message can be judged as not a message that was sent from a legitimate sender or can be detected as having been altered by a third party during communication.

Methods of message authentication include methods in which a first communication apparatus that transmits message M holds state variables such as counters (stateful MAC) and methods in which state variables are not held (stateless MAC). The stateless MAC methods further include methods (randomized MAC) that permit the generation of a uniform random number U that is independent of message M each time by the first communication apparatus that transmits message M and also includes methods (deterministic MAC) other than the randomized MAC methods.

In MAC that use state variables or random numbers, these values are used both in the generation of tag T and in the transmission of tag T by way of the communication channel to the destination of message M without being encrypted. Tag T that is generated in randomized MAC can be represented as T=F(K, M, U), where F represents an encryption function, K represents a key of encryption function F, M represents a message, and U represents a random number. The first communication apparatus transmits random number U, message M, and tag T to a second communication apparatus. The second communication apparatus, which is the destination of message M, having received random number U', message M', and tag T' that have been transmitted in by way of the communication channel, finds tag T1 for verification from message M' and random number U' that were received and secret key K that is identical to secret key K that is stored by the first communication apparatus and, by comparing tag T1 for verification with tag T' that was transmitted in, determines whether random number U', message M', and tag T' that have been received have been altered while being transmitted in by way of the communication channel.

In the following explanation, a case is described as an example in which the number of bits of random number U is n bits and the number of bits of tag T is s bits (where s is a positive integer equal to or less than n). In addition, message M is a binary sequence (bit string) of any number of bits, but in the interest of simplifying the explanation, a case is described as an example in which the maximum value of the number of bits of message M is L.

In randomized MAC, keyed encryption function F that receives data of any number of bits that is the same as the number of bits n of random number U and supplies the data that have been encrypted that are of a number of bits identical to the number of bits n of random number U (hereinbelow referred to as "n-bit input/output") and keyed hash function H that receives data of variable length as input and that supplies a hash value of a number of bits that is identical to the number of bits n of random number U are used to compute tag T as the following Formula 1:

[Formula 1]

$$T = \text{chop}(F(Ke, U) + H(Kh, M)) \quad \text{(Formula 1)}$$

Here, Ke shown in Formula 1 is the key of encryption function F and Kh is the key of hash function H. In addition, the symbol "+" is an arithmetic symbol that indicates the exclusive OR for each bit. In addition, chop(x) is a function for extracting the value contained in bits of a predetermined number of bits s from among x.

Keyed encryption function F is a sufficiently safe function referred to as a pseudorandom function. A block code such as AES (Advanced Encryption Standard) is typically used as keyed encryption function F.

In Hash function H, it is desired that when two different messages M and M' are applied as input, the probability Pr that each of the hash values that are supplied to respective messages M and M' will match is extremely small. In other words, in Hash function H, it is desired that the following Formula 2 holds true for the pair (M, M') of messages M and M' that differ from each other in which the bit number is equal to or less than an arbitrary number of bits L for any positive number e that is sufficiently small.

[Formula 2]

$$Pr[H(Kh, M) = H(Kh, M')] \leq e \quad \text{(Formula 2)}$$

Because an arbitrary positive number e cannot be smaller than the reciprocal of the output size of hash function H, in this case, the minimum value of positive number e is $2^{(n)}$. In addition, because positive number e can take the maximum value L of the number of bits of message M that is the object of computation of hash value S as a parameter, the notation e(L) is appropriate. However, in the following explanation, a case is taken by way of example in which the maximum value L of the number of bits of message M is treated as a constant and e(L) is abbreviated as "e." This type of function is referred to as an "e-almost universal hash function" and effective construction is possible by means of an algebraic constitutive method such as a polynomial operation on a finite field. A randomized MAC that is constructed in this way is referred to as a randomized Carter-Wegman MAC (randomized CW-MAC).

A typical definition of the safety of a randomized MAC is next described. An attack scenario in a randomized MAC can be divided into two phases, a tag generation phase and a forgery phase. First, in the tag generation phase, a third party that carries out an attack uses a third communication apparatus that differs from the first communication apparatus and a second communication apparatus to acquire Qmac items of data that contain random number U, message M and tag T that are transmitted in from the first communication apparatus for any message M that can be selected. Next, in the forgery phase, the third party uses the third communication apparatus to generate Qver items of forged data that contain random number U', message M', and tag T' based on the Qmac items of data (random number U, message M and tag T) that were acquired in the tag generation phase and transmits the forged data to the second communication apparatus. The attack is considered to have been successful if the second communication apparatus then judges that at least one item of forged data of the forged data (random number U', message M', and tag T') that was transmitted in from the communication apparatus of the third party is data that have been transmitted from the first communication apparatus and that have not been altered.

The forged data here described may be any type of data as long as they are data that differ from data (random number U, message M, and tag T) that were transmitted by the first communication apparatus that was observed by the third party in the tag generation phase. For example, (random number U', message M, tag T) which is data that only random number U has been altered to a different random number U' in data (random number U, message M, and tag T) that were observed in the tag generation phase, may be generated as forged data. This concept of safety is referred to as "strong unforgeability." As a standard of safety, a case in which a message that is contained in forged data is required to differ from message M that was observed in the tag generation phase is referred to as "weak unforgeability."

The relation expressed by the following Formula 3 holds for the probability of success in forgery in the sense of the strong unforgeability of randomized CW-MAC that employs the hash function H and keyed encryption function F.

[Formula 3]

$$Suc(Qmac, Qver, \text{time}) \leq Sec(F, Qmac+Qver, \text{time}') + Qmac^2/2^n + Qver(e+\frac{1}{2^s}) \qquad \text{(Formula 3)}$$

Here, Suc(Qmac, Qver, time) shown on the left side of Formula 3 represents the probability of success of forgery in a case in which a third party acquires Qmac items of transmitted data in the tag generation phase, generates Qver items of forged data in the forgery phase, and the overall amount of computation is "time." In addition, Sec(F, Qmac+Qver, time') shown on the right side of Formula 3 represents the maximum gain (discrimination success probability−($\frac{1}{2}$)) when the third party has carried out discrimination of keyed encryption function F by means of a chosen plaintext attack in which the amount of computation is "time" and a true random function for generating a random number U "Qmac+Qver" times in a black box state. The computation amount "time" is a polynomial order of computation amount "time."

From the above-described Formula 3, it can be seen that there are three conditions necessary for adequately reducing the probability of forgery in randomized CW-MAC: that keyed function F be a pseudorandom function that has sufficient safety against "Qmac+Qver" instances of chosen plaintext attack; that the number Qmac of items of data that a third party acquires be extremely small compared to $2^{(n/2)}$ and that the number Qver of items of forged data generated by the third party be extremely small compared to each of positive number e and $\frac{1}{2^s}$.

The condition that is particularly problematic in terms of improving safety against attacks is the second condition of these three conditions. The reason for this is that the number Qmac of items of data (random number U, message M, and tag T) that are acquired by a third party can be made extremely large by the static observation of a communication channel by the third party. On the other hand, the number Qver of items of forged data generated by a third party is typically a value that is far smaller than Qmac because interference on the communication channel can be perceived when failures of message authentication occur with frequency in the second communication apparatus that is receiving forged data. In addition, the exponent of the Qmac term is "2," while the exponent of the term of Qver that is the number of items of forged data is "1." As a result, when the number of bits n of random number U and the number of bits s of tag T are identical to the reciprocal of positive number e (i.e., when n=1/e=s), when the term Qver increases, it increases extremely slowly compared to Qmac. Based on the above considerations, it is believed that Qmac actually coincides with the life of the MAC key. In other words, after transmitting message M a number of times that is far smaller than $2^{(n/2)}$ in the above-described randomized CW-MAC, key K for tag T generation must be updated regardless of the presence or absence of attacks. This property means that the Key LifeTime, (hereinbelow abbreviated as "KLT"), which is the maximum value of the number of times a message can be transmitted by a particular key K, is "n/2." In addition, the maximum value of Qmac that is $2^{(n/2)}$ is referred to as the "birthday bound" for n.

As a method for making this KLT greater than n/2, a MACRX method such as disclosed in Non-Patent Document 1 can be considered. This MACRX method involves making the number of bits of random number U greater than the number of bits n. For example, when the number of bits of random number U is "3×n" bits and the number of bits of tag T is n bits, tag T that is generated in the MACRX method is represented by the following Formula 4:

[Formula 4]

$$T=F(Ke, U1)+F(Ke, U2)+F(Ke, U3)+H(Kh, M) \qquad \text{(Formula 4)}$$

Each of random numbers U1, U2, and U3 shown in Formula 4 are independent uniform random numbers for which the number of bits is n bits. Thus, in the MACRX method, a first communication apparatus transmits random numbers U1, U2, and U3, message M, and tag T to a second communication apparatus. However, because a mere reordering of random numbers U1, U2, and U3 can achieve a successful forgery, only unforgeability in the weak sense can be guaranteed. In order to ensure strong unforgeability in the MACRX, random numbers U1, U2, U3 must be transmitted after subjecting these random numbers to appropriate encoding.

According to Non-Patent Document 1, the weak unforgeability of the MACRX method can be represented by the following Formula 5:

[Formula 5]

$$Suc(Qmac, Qver, \text{time}) \leq Sec(F, 3(Qmac+Qver), \text{time}')+d(3,n)Qmac^3/2^{3n}+Qver\ e \qquad \text{(Formula 5)}$$

Because d(3, n) shown in Formula 5 is actually a small value, it can be seen that KLT is substantially n. In the MACRX method, it is further indicated that KLT remains unchanged as "n/2" when the number of bits of random number U is made less than or equal to 2n bits.

Non-Patent Document 2 discloses a format that includes random number U among the data that are applied as input to hash function H in randomized MAC, i.e., a method of generating tag T such as represented in Formula 6 below:

[Formula 6]

$$T=F(Ke, H(Kh, U\|M)) \qquad \text{(Formula 6)}$$

The symbol "∥" shown in FIG. 6 indicates the coupling of random number U and message M. However, in the technique disclosed in Non-Patent Document 2, hash function H is also applied to random number U in order to limit the increase of the probability e that the hash values obtained in each case will conflict with each other as the maximum value L of the number of bits of each message increases when hash function H is applied to each of messages that differ from each other. As a result, KLT in this technique remains unchanged as "n/2" and cannot be made greater than "n/2."

Non-Patent Document 3 and Patent Document 1 disclose that the KLT of a Carter-Wegman MAC is substantially n when state variables such as counters are used in place of random numbers, and moreover, when a sufficiently good universal hash function and n-bit input/output encryption function F are used to generate tag T. In these cases, however, the communication apparatus that transmits message M must hold the state variables such as counters. As a result, the use of a plurality of devices that use the same key in these techniques entails the disadvantage that establishing synchronization among the devices is necessary.

In addition, Non-Patent Document 4 discloses a method that can make KLT substantially n in a deterministic MAC that does not employ random numbers or counters. However, the number of bits of data that are applied as input to encryption function F in this technique is 2n bits or more, and this technique is therefore problematic because it cannot be applied to MACRX or randomized Carter-Wegman MAC that have different preconditions.

The above-described Patent Document 1 and Non-Patent Documents 1-4 are as shown below:

LITERATURE OF THE PRIOR ART

Patent Documents

Patent Document 1: Specification of U.S. Pat. No. 5,757,913

Non-Patent Documents

Non-Patent Document 1: M. Bellare, O. Goldreich, and H. Krawczyk, Stateless evaluation of pseudo-random functions: Security beyond the birthday barrier, Advances in Cryptology-CRYPTO '99, $19^{th}$ Annual International Cryptology Conference, Santa Barbara, Calif., USA, Aug. 15-19, 1999, Proceedings. Lecture Notes in Computer Science 1666 Springer 1999, pp. 270-287.
Non-Patent Document 2: Y. Dodis and K. Pietrzak, Improving the Security of MACs Via Randomized Message Preprocessing, Fast Software Encryption, $14^{th}$ International Workshop, FSE 2007, Luxembourg, Luxembourg, Mar. 26-28, 2007, Revised Selected Papers. Lecture Notes in Computer Science 4593 Springer 2007, pp. 414-433.
Non-Patent Document 3: D. J. Bernstein. Stronger Security Bounds for Wegman-Carter-Shoup Authenticators. Advances in Cryptology—EUROCRYPT '05, LNCS 3494, pp. 164-180,
Non-Patent Document 4: K. Yasuda. A One-Pass Mode of Operation for Deterministic Message Authentication—Security beyond the Birthday Barrier. Fast Software Encryption. FSE '08, LNCS 5086. pp. 316-333, 2008.

SUMMARY OF THE INVENTION

In the above-described techniques that employ randomized Carter-Wegman MAC, the problem exists that when the number of bits of random numbers is n bits, the maximum message transmission number, which is the number of times messages can be transmitted by one key K, must be made a value that is sufficiently smaller than $2^{(n/2)}$ times.

In addition, although the maximum number of message transmissions can be made $2^n$ in the technique disclosed in Non-Patent Document 1, the number of bits of random number U must be made at least 3n bits. As a result, the problems arise in which not only does the processing load increase for the communication apparatus that transmits message M to generate random number U, but the amount of data that are appended to random number U, message M, and tag T that are to be transmitted also increases.

An exemplary object of the invention is to provide a tag generation apparatus, a tag verification apparatus, communication system, tag generation method, tag verification method, and recording medium on which a program is recorded that can provide a solution to the above-described problems.

A tag generation apparatus according to an exemplary aspect of the invention, is a tag generation apparatus that adds, to a message for which input was received from the outside, a tag for distinguishing the presence or absence of alteration to this message, wherein the tag generation apparatus includes: a hash unit that generates, as a hash value, a value obtained by applying a predetermined hash function to the message; a random number generation unit that, when input of said message is received from the outside, generates a random number that is independent of the message; a random number encryption unit that generates, as a first intermediate variable, a value obtained by applying an encryption function having a first key to the random number; a masked encryption unit that generates, as a second intermediate variable, a value obtained by applying the encryption function having a second key to the exclusive OR of the random number and the hash value; a tag generation unit that generates, as the tag, a value that is contained in bits of a predetermined number of bits that is less than or equal to the number of bits of the random number that are extracted from among the exclusive OR of the first intermediate variable and the second intermediate variable; and an output unit that transmits the message, the random number, and the tag to the destination of the message.

A tag verification apparatus according to an exemplary aspect of the invention, is a tag verification apparatus that verifies a message that is transmitted in from the outside by using a tag for distinguishing the presence or absence of alteration to this message, the tag verification apparatus including: a hash unit that generates, as a verification hash value, a value that is obtained by applying a predetermined hash function to the message; a random number encryption unit that generates, as a first verification intermediate variable, a value obtained by applying an encryption function having a first verification key to a random number that was transmitted in together with the message; a masked encryption unit that generates, as a second verification intermediate variable, a value obtained by applying the encryption function having a second verification key to the exclusive OR of the random number and the verification hash value; a tag generation unit that generates, as a verification tag, a value that is contained in bits of a predetermined number of bits that is less than or equal to the number of bits of the random number and that are extracted from among the exclusive OR of the first verification intermediate variable and the second verification intermediate variable; and a comparison unit that compares the verification tag and the tag that is transmitted in from the outside together with the message.

A communication system according to an exemplary aspect of the invention, is a communication system having a tag generation apparatus that adds, to a message for which input was received from the outside, a tag for distinguishing the presence or absence of alteration to this message and a tag verification apparatus that uses the tag to verify the message that was transmitted in from the transmission origin of the message; wherein the tag generation apparatus: generates as a hash value a value that is obtained by applying a predetermined hash function to the message; when input of the message is received from the outside, generates a random number that is independent of the message; generates as a first intermediate variable a value that is obtained by applying an encryption function that has a first key to the random number; generates as a second intermediate variable a value obtained by applying the encryption function having a second key to the exclusive OR of the random number and the hash value; generates as the tag a value that is contained in bits of a predetermined number of bits that is less than or equal to the number of bits of the random number and that are extracted from among the exclusive OR of the first intermediate variable and the second intermediate variable; and transmits the message, the random number, and the tag to the tag verification apparatus that is the destination of the message; and the tag verification apparatus generates, as a verification hash value, a value that is obtained by applying the hash function to the message that is transmitted in: generates as a first verification intermediate variable a value obtained by applying the encryption function having a first verification key to a random number that was transmitted in together with the message; generates as a second verification intermediate variable a value that is obtained by applying the encryption function having a second verification key to the exclusive OR of the random number that was transmitted in and the verification hash value; generates as a verification tag a value that is contained in bits of a predetermined number of bits that are extracted from among the exclusive OR of the first verification intermediate variable and the second verification intermediate variable; and compares the verification tag and the tag that was transmitted in from the outside together with the message.

A tag generation method according to an exemplary aspect of the invention, is a tag generation method that adds to a message for which input is received from the outside a tag for distinguishing the presence or absence of alteration to this message, the tag generation method including: a hash process of generating as a hash value a value that is obtained by applying a predetermined hash function to a message; a random number generation process of, when input of the message is received from the outside, generating a random number that is independent of the message; a random number encryption process of generating as a first intermediate variable a value that is obtained by applying an encryption function having a first key to the random number; a masked encryption process of generating as a second intermediate variable a value that is obtained by applying the encryption function having a second key to the exclusive OR of the random number and the hash value: a tag generation process of generating as the tag a value that is contained in bits of a predetermined number of bits that is less than or equal to the number of bits of the random number and that are extracted from among the exclusive OR of the first intermediate variable and the second intermediate variable; and an output process of transmitting the message, the random number, and the tag to the destination of the message.

A tag verification method according to an exemplary aspect of the invention, is a tag verification method of verifying a message that is transmitted in from the outside by using a tag for distinguishing the presence or absence of alteration to this message, the tag verification method including: a hash process of generating as a verification hash value a value obtained by applying a predetermined hash function to the message; a random number encryption process of generating as a first verification intermediate variable a value that is obtained by applying an encryption function having a first verification key to a random number that was transmitted in together with the message; a masked encryption process of generating as a second verification intermediate variable a value obtained by applying the encryption function having a second verification key to the exclusive OR of the random number and the verification hash value; a tag generation process of generating as a verification tag a value contained in bits of a predetermined number of bits that is less than or equal to the number of bits of the random number and that are extracted from among the exclusive OR of the first verification intermediate variable and the second verification intermediate variable; and a comparison process of comparing the verification tag and the tag that was transmitted in from the outside together with the message.

A recording medium according to an exemplary aspect of the invention, is a recording medium that records a program that is executed by a computer, the recording medium recording a program that causes a tag generation apparatus, which adds to a message that is received as input from the outside a tag for distinguishing the presence or absence of alteration to the message, to execute: a hash procedure of generating as a hash value a value obtained by applying a predetermined hash function to the message; a random number generation procedure of, when input of the message is received from the outside, generating a random number that is independent of the message; a random number encryption procedure of generating as a first intermediate variable a value obtained by applying an encryption function having a first key to the random number; a masked encryption procedure of generating as a second intermediate variable a value obtained by applying the encryption function having a second key to the exclusive OR of the random number and the hash value; a tag generation procedure of generating as the tag a value contained in bits of a predetermined number of bits that is less than or equal to the number of bits of the random number and that are extracted from among the exclusive OR of the first intermediate variable and the second intermediate variable; and an output procedure of transmitting the message, the random number, and the tag to the destination of the message.

A recording medium according to an exemplary aspect of the invention, is a recording medium that records a program that is executed by a computer, the recording medium recording a program that causes a tag verification apparatus, which verifies a message that is transmitted in from the outside by using a tag for distinguishing the presence or absence of alteration to this message, to execute: a hash procedure of generating as a verification hash value a value that is obtained by applying a predetermined hash function to the message; a random number encryption procedure of generating as a first verification intermediate variable a value obtained by applying an encryption function having a first verification key to a random number that is transmitted in together with the message; a masked encryption procedure of generating as a second verification intermediate variable a value that is obtained by applying the encryption function having a second verification key to the exclusive OR of the random number and the verification hash value; a tag generation procedure of generating as a verification tag a value that is contained in bits of a predetermined number of bits that is less than or equal to the number of bits of the random number and that are extracted from among the exclusive OR of the first verification intermediate variable and the second verification intermediate variable; and a comparison procedure of comparing the verification tag with the tag that is transmitted in from the outside together with the message.

BEST MODE FOR CARRYING OUT THE INVENTION

First Exemplary Embodiment

The communication system (including the tag generation apparatus, tag verification apparatus, tag generation method, tag verification method, and program) according to the first exemplary embodiment of the present invention is next described.

Figure 1:
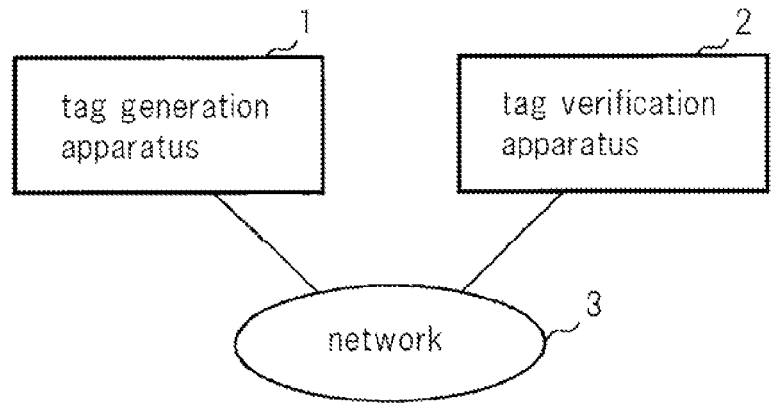
FIG. 1 shows the configuration of a communication system according to the first exemplary embodiment of the present invention.

The configuration of the communication system of the present exemplary embodiment is first described. As shown in FIG. 1, this communication system is made up of tag generation apparatus 1 and tag verification apparatus 2 that are connected together by way of communication channel 3 so as to allow communication.

Tag generation apparatus 1 transmits any message M to tag verification apparatus 2. When transmitting message M, tag generation apparatus 1 generates tag T in order to distinguish whether or not this message M has been altered, and transmits tag T together with message M.

Tag verification apparatus 2 uses tag Tr that was transmitted in together with message Mr to verify message Mr that has been transmitted in by way of communication channel 3.

The configuration of tag generation apparatus 1 shown in FIG. 1 is next described in detail with reference to FIG. 2.

Figure 2:
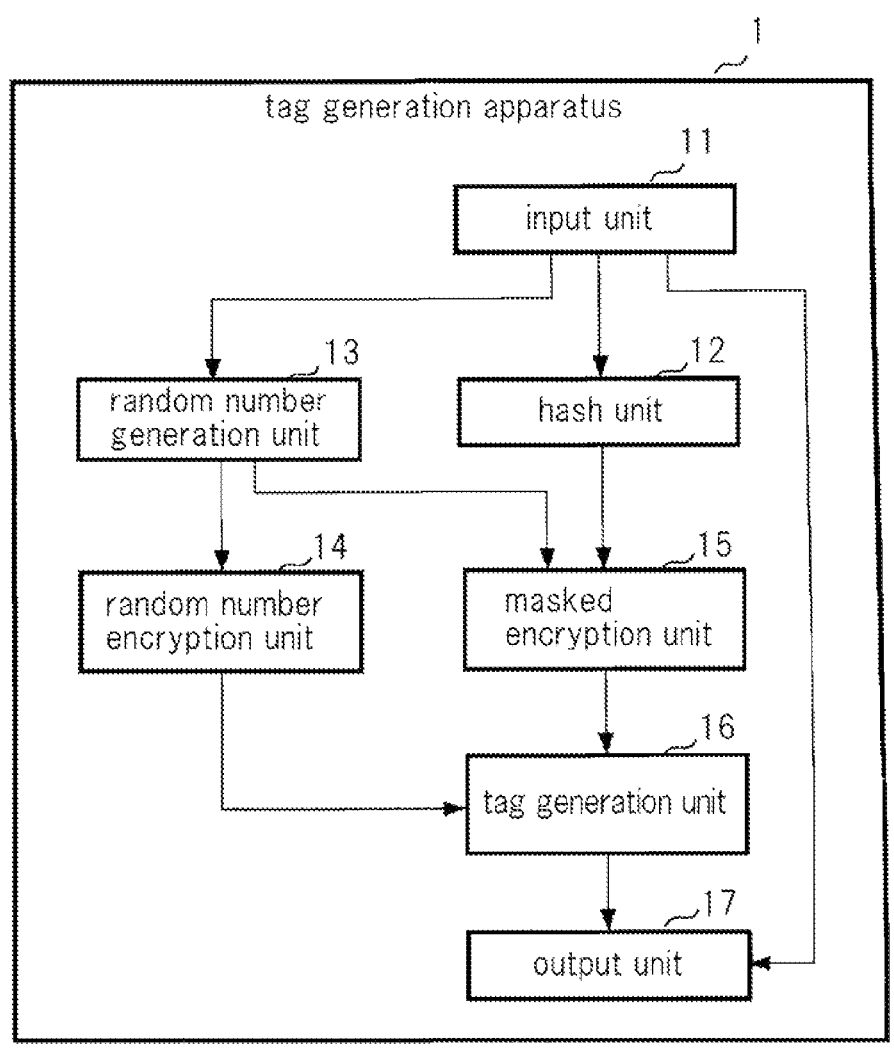
FIG. 2 shows the configuration of the tag generation apparatus shown in FIG. 1.

As shown in FIG. 2, tag generation apparatus 1 of the first exemplary embodiment is made up of input unit 11, hash unit 12, random number generation unit 13, random number encryption unit 14, masked encryption unit 15, tag generation unit 16, and output unit 17.

Upon receiving the input of message M from the outside, input unit 11 reports the reception to random number generation unit 13. Input unit 11 further supplies this message M to hash unit 12 and output unit 17. One example of input unit 11 that can be used is any input apparatus such as a keyboard that allows the input of characters.

Hash unit 12 generates, as hash value S, a value obtained by applying "a predetermined hash function H" to message M that was supplied from input unit 11. Hash unit 12 then supplies the hash value S as output to masked encryption unit 15.

In this explanation, hash unit 12 generates hash value S by applying, as the predetermined hash function H, a keyed hash function H having hash key Kh to message M.

"Hash key Kh" in this case is information that is used, when generating hash value S that is added to message M, to make the maximum value of the number of bits of this hash value S a number of bits that is identical to the block length of message M.

In addition, when the key of hash function H is hash key Kh, hash value S that is generated by applying hash function H to message M is S=H(Kh, M). Here, it is desired that hash function H be "e-almost XOR (eXclusive OR) universal" for any sufficiently small positive number e with respect to the set of message M that is the object of the generation of hash value S.

Here, e-almost XOR universal indicates that when hash function H is applied to each of any two different messages M and M', the probability Pr[H(Kh, M)=y, H(Kh, M')=y'] that the hash value that is generated attendant to message M will be y, and moreover, that the hash value that is generated attendant to message M' will be y' is less than or equal to positive number e for any y and y'. The probability space that is attendant to the probability Pr[H(Kh, M)=y, H(Kh, M')=y'] is defined by hash key Kh. In addition, a keyed function having these characteristics is referred to as an e-almost XOR universal hash function, and for example, can be realized by a polynomial on a finite field.

As a more specific example, an operation is described in which hash unit 12 generates hash value S by applying hash function H to message M in which the number of bits is n×L bits when the number of bits of hash key Kh of hash function H is n bits. In this case, hash unit 12 partitions message M into L blocks M[0], M[1], ..., M[L] in which the number of bits of each block is n bits. Hash unit 12 then computes Y[L] in accordance with the following Formula 7 and supplies Y[L] as hash value S.

[Formula 7]

$$Y[0]=0$$

$$Y[i]=GFmul(Y[i-1]+M[i], Kh) \quad \text{(Formula 7)}$$

For $i=1, \ldots, L$

Here, GFmul(Y[i−1]+M[i], Kh) shown in Formula 7 is multiplication that takes "Y[i−1]+M[i]" and hash key Kh as elements on finite field $GF(2^n)$.

Hash unit 12 may generate hash value S by subjecting message M to a function for carrying out arithmetic multiplication that specializes in an actual implementation environment such as disclosed in Document A (S. Halevi and H. Krawczyk, MMH: Software Message Authentication in the Gbit/second rates, Fast Software Encryption, 4th International Workshop, FSE '97, Lecture Notes in Computer Science; Vol. 1267, February 1997).

Alternatively, hash unit 12 may generate hash value S by subjecting message M to a computationally complex XOR universal hash function. Here, the XOR universal hash function is a function constructed by using encryption function F such as block coding, and has the characteristic of enabling limitation of the maximum value of the probability of an output pair to no more than an extremely small value based on the computationally complex safety of encryption function F. CBC-MAC (Cipher Block Chaining Message Authentication Code) is one example of message authentication that uses an XOR universal hash function. When CBC-MAC is used to generate hash value S attendant to a particular message M for which the number of bits is L×n bits, hash unit 12 partitions message M into L blocks M[0], M[1], . . . , M[L] in which the number of bits of each block is n bits. Hash unit 12 then uses n-bit block code E to compute Y[L] according to the following Formula 8 and supplies Y[L] as hash value S.

[Formula 8]

$Y[0]=M[0]$ $Y[i]=E(K,Y[i-1]+M[i])$ (Formula 8)

For $i=1, \ldots L$

Hash unit 12 can further generate hash value S by subjecting message M to, for example, PMAC (Parallelizable MAC) that is capable of parallel execution as disclosed in Document B (P. Rogaway. Efficient Instantiations of Tweakable Blockciphers and Refinements to Modes OCB and PMAC. Advances in Cryptology—ASIACRYPT '04. LNCS 3329, pp. 16-31, 2004). When padding of message M is not necessary, hash unit 12 uses PMAC to compute Y[L] according to the following Formula 9 and supplies Y[L] as hash value S.

[Formula 9]

$V[i]=mul(E(K,0),2^i)$ $Y[i]=E(K,V[i]+M[i])$

For $i=1, \ldots, L-1$ $SUM=Y[1]+Y[2]+\ldots+Y[L-1]M[L]$ $Y[L]=E(K,mul(V[L-1],3)+SUM)$ (Formula 9)

CBC-MAC and PMAC are deterministic MAC that do not permit generation of random number U that is independent of message M for each instance as described hereinabove, and are capable of generating forged data by means of approximately $2^{(n/2)}$ instances of chosen plaintext attacks. In the present exemplary embodiment, however, hash unit 12 may generate hash value S by using any hash function H as long as hash function H is a hash function having XOR universality.

Hash unit 12 can also generate hash value S by subjecting message M to, for example, HMAC (Keyed-Hashing for Message Authentication Code) such as described in Document C (M. Bellare, R. Canetti, and H. Krawczyk. Keyed Hash Functions and Message Authentication, Proceedings of Crypto '96, LNCS 1109, pp. 1-15) that is based on cryptology hash functions.

When reception of the input of message M from the outside is reported from input unit 11, random number generation unit 13 generates random number U that is independent of message M and for which the number of bits is n bits. Random number generation unit 13 then supplies random number U to random number encryption unit 14 and masked encryption unit 15.

The method by which random number generation unit 13 generates random number U can take any form as long as it is a method capable of generating random number U that has sufficiently high entropy. For example, a physical phenomenon such as thermal noise may be used to generate random number U. Alternatively, the method may be a method of generating random number U based on data for which input unit 11 that is attendant to the OS (Operating System) of a general-use PC (Personal Computer) receives as input from a user.

Random number encryption unit 14 generates first intermediate variable V for which the number of bits is n bits by using encryption function F having "first key Ke1" to encrypt random number U that is supplied from random number generation unit 13. Random number encryption unit 14 then supplies first intermediate variable V to tag generation unit 16.

"First key Ke1" in this case is information for generating first intermediate variable V having the same number of bits as random number U. In addition, n-bit block encryption or keyed cryptology hash function may be offered as examples of encryption function F.

Masked encryption unit 15 computes the exclusive OR of random number U that is supplied from random number generation unit 13 and hash value S that is supplied from hash unit 12. Masked encryption unit 15 then generates, as second intermediate variable W, a value obtained by encrypting the exclusive OR of random number U and hash value S by encryption function F having second key Ke2. Masked encryption unit 15 then supplies second intermediate variable W to tag generation unit 16.

"Second key Ke2" in this case is information for generating second intermediate variable W having the same number of bits as the exclusive OR of random number U and hash value S.

Masked encryption unit 15 generates, as third intermediate variable Z, a value obtained by using encryption function F having third key Ke3 to encrypt hash value S that was supplied from hash unit 12. Masked encryption unit 15 then supplies third intermediate variable Z to tag generation unit 16.

"Third key Ke3" in this case is information for generating third intermediate variable Z having the same number of bits as hash value S.

In addition, encryption function F that random number encryption unit 14 uses in the generation of first intermediate variable V and encryption function F that masked encryption unit uses in the generation of second intermediate variable W and third intermediate variable Z are the same. Second key Ke2 and third key Ke3 used by masked encryption unit 15 may be the same or may differ from first key Ke1 used by random number encryption unit 14.

Tag generation unit 16 computes the exclusive OR of first intermediate variable V that is supplied from random number encryption unit 14 and second intermediate variable W and third intermediate variable Z that are supplied from masked encryption unit 15. Tag generation unit 16 then generates as tag T "a value contained in bits of a predetermined number of bits s" that are extracted from among the exclusive OR of first intermediate variable V, second intermediate variable W, and third intermediate variable Z. "Predetermined number of bits s" is less than or equal to the number of bits n of random number U. Tag generation unit 16 then supplies tag T to output unit 17.

The method of extracting a value contained in bits of a predetermined number of bits s may be, for example, extracting the value contained in s bits from the most significant of the exclusive OR of first intermediate variable V, second intermediate variable W, and third intermediate variable Z.

Output unit 17 links random number U that was supplied from random number generation unit 13, tag T that was supplied from tag generation unit 16, and message M that was supplied from input unit 11. Output unit 17 then transmits the data in which random number U, tag T, and message M are linked to tag verification apparatus 2 that is the destination of this message M. In addition, output unit 17 may also supply random number U, tag T, and message M that are linked to, for example, a display device such as a computer display or a printer.

Figure 3:
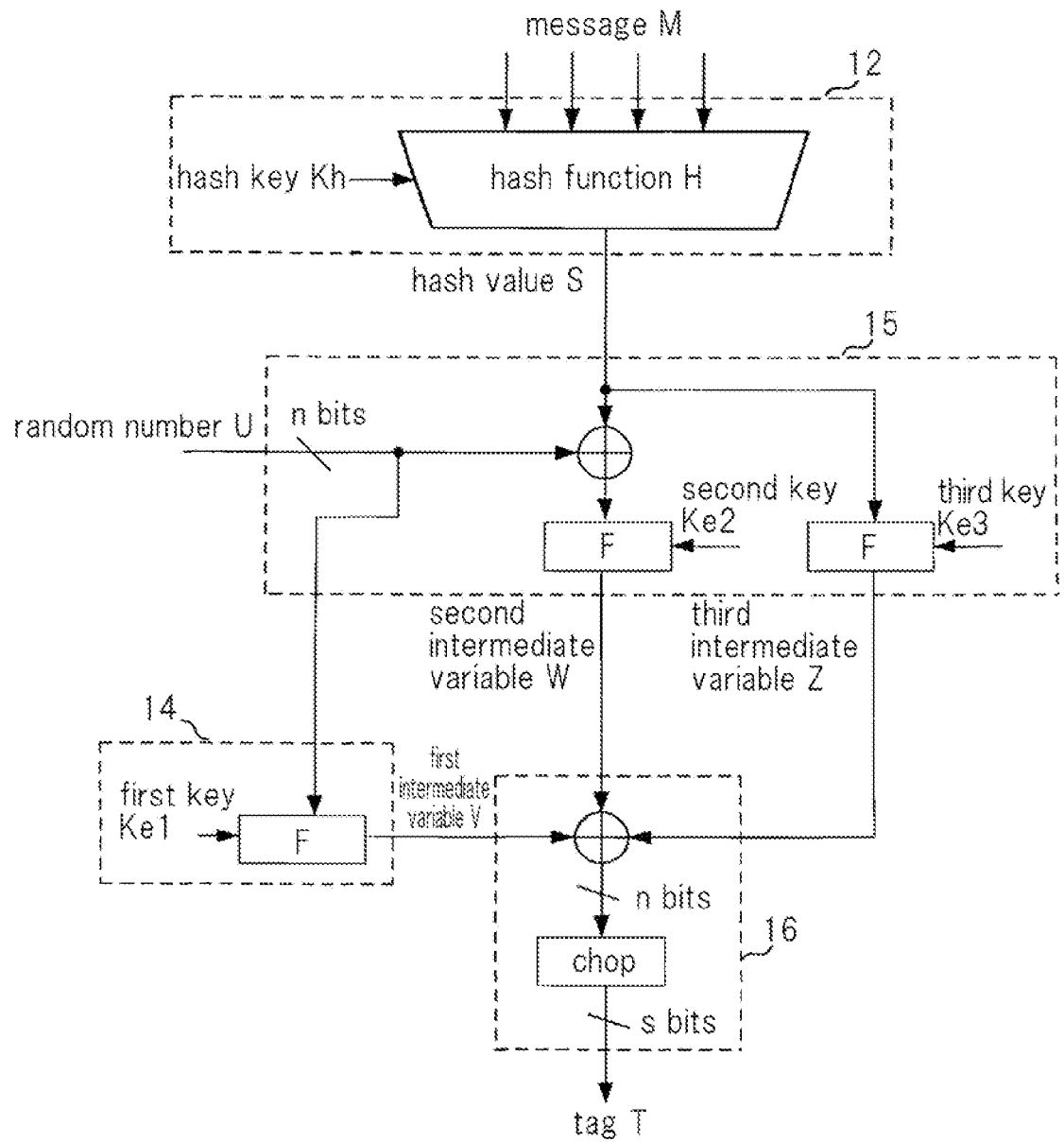
FIG. 3 shows one form of the configuration of the hash unit, random number encryption unit, masked encryption unit, and tag generation unit shown in FIG. 2.

Hash unit 12, random number encryption unit 14, masked encryption unit 15, and tag generation unit 16 shown in FIG. 2 can be realized by the form of configuration shown in FIG. 3.

Figure 4:
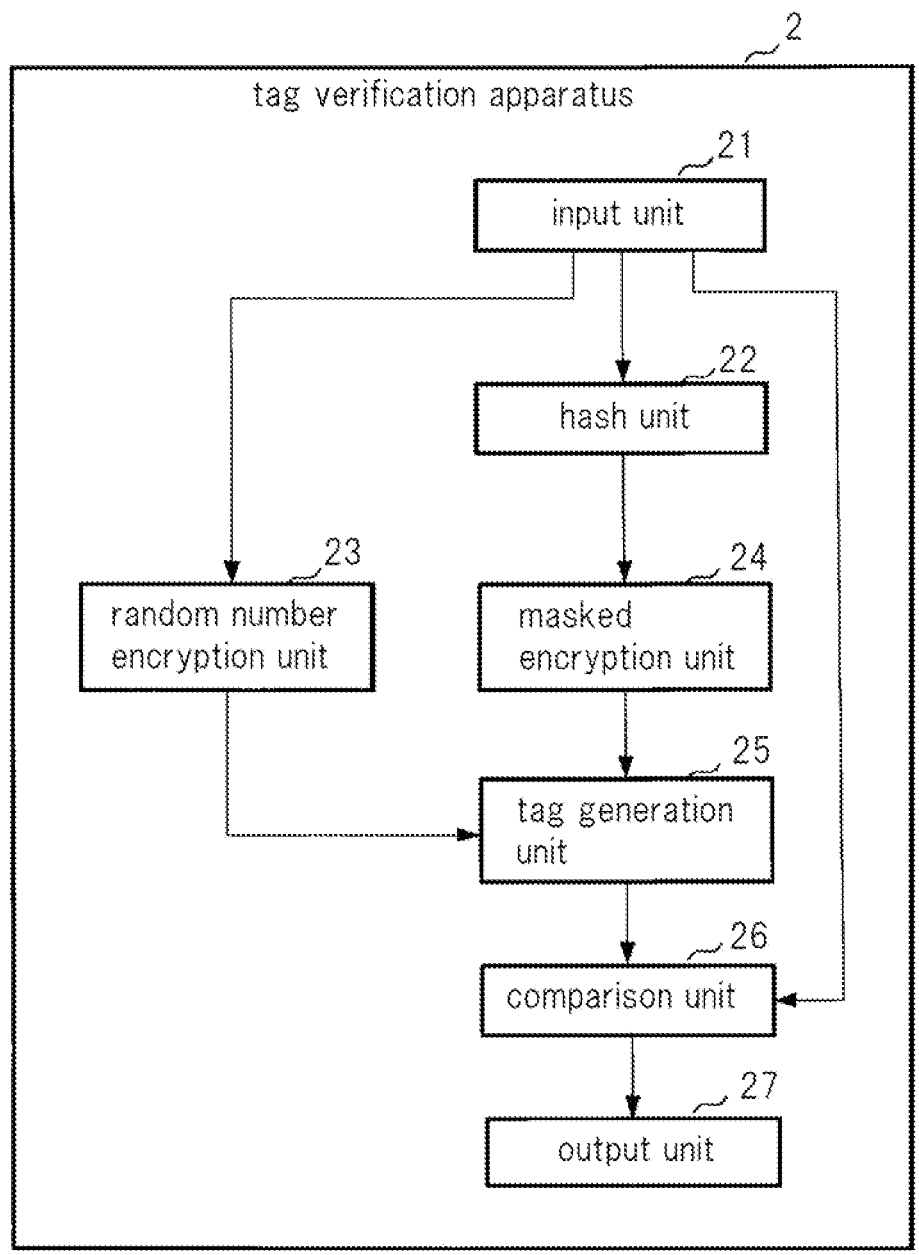
FIG. 4 shows the configuration of the tag verification apparatus shown in FIG. 1.

The configuration of tag verification apparatus 2 is next described with reference to FIG. 4. FIG. 4 is a block diagram showing the configuration of tag verification apparatus 2 of the first exemplary embodiment.

As shown in FIG. 4, tag verification apparatus 2 is made up from input unit 21, hash unit 22, random number encryption unit 23, masked encryption unit 24, tag generation unit 25, comparison unit 26, and output unit 27.

Input unit 21 receives data in which message Mr, random number Ur, and tag Tr are linked and that have been transmitted in by way of communication channel 3 from any transmission origin that includes tag generation apparatus 1.

Input unit 21 then supplies message Mr to hash unit 22. In addition, input unit 21 supplies random number Ur to random number encryption unit 23. Input unit 21 further supplies tag Tr to comparison unit 26. In addition, input unit 21 may be any input device such as a keyboard that receives from the outside the input of message Mr, random number Ur, and tag Tr that were transmitted in from tag generation apparatus 1.

Hash unit 22 generates, as verification hash value S1, a value that is obtained by applying a predetermined hash function H to message Mr that was supplied from input unit 21. Hash unit 22 then supplies verification hash value S1 to masked encryption unit 24.

In the present exemplary embodiment, hash unit 22 generates verification hash value S1 by applying, as predetermined hash function H, a keyed hash function H having hash key Kh to message Mr.

Hash function H and hash key Kh that are used by hash unit 22 in the generation of verification hash value S1 are the same as hash function H and hash key Kh that are used by hash unit 12 in the generation of hash value S.

Random number encryption unit 23 encrypts random number Ur that was supplied from input unit 21 by encryption function F having first verification key Kv1 to generate first verification intermediate variable V1 in which the number of bits is n bits. Random number encryption unit 23 then supplies first verification intermediate variable V1 to tag generation unit 25.

"First verification key Kv1" in this case is information for generating first verification intermediate variable V1 that has the same number of bits as the number of bits of random number Ur.

In addition, encryption function F and first verification key Kv1 that random number encryption unit 23 uses in the encryption of random number Ur are the same as encryption function F and first key Ke1 that random number encryption unit 14 uses in the encryption of random number U.

Masked encryption unit 24 computes the exclusive OR of random number Ur that was transmitted in from input unit 21 and verification hash value S1 that was transmitted in from hash unit 22. Masked encryption unit 24 then generates, as second verification intermediate variable W1, a value that is obtained by encrypting the exclusive OR of random number Ur and verification hash value S1 using encryption function F having second verification key Kv2. Masked encryption unit 24 then supplies second verification intermediate variable W1 to tag generation unit 25.

"Second verification key Kv2" in this case is information for generating second verification intermediate variable W1 that has the same number of bits as the number of bits of the exclusive OR of random number Ur and verification hash value S1.

In addition, masked encryption unit 24 generates, as third verification intermediate variable Z1, a value that is obtained by using encryption function F having third verification key Kv3 to encrypt verification hash value S that was supplied from hash unit 22. Masked encryption unit 24 then supplies third verification intermediate variable Z1 to tag generation unit 25.

"Third verification key Kv3" in this case is information for generating third verification intermediate variable Z1 that has the same number of bits as the number of bits of verification hash value S1.

In addition, encryption function F, second verification key Kv2, and third verification key Kv3 that masked encryption unit 24 uses in the generation of second verification intermediate variable W1 and third verification intermediate variable Z1 are the same as encryption function F, second key Ke2, and third key Ke3 that masked encryption unit 15 uses in the generation of second intermediate variable W and third intermediate variable Z.

Tag generation unit 25 computes the exclusive OR of first verification intermediate variable V1 that is supplied from random number encryption unit 23 and second verification intermediate variable W1 and third verification intermediate variable Z1 that are supplied from masked encryption unit 24. Tag generation unit 25 then generates, as verification tag T1, a value that is contained in bits of a predetermined number of bits that are extracted from the exclusive OR of first verification intermediate variable V1, second verification intermediate variable W1 and third verification intermediate variable Z1. The "predetermined number of bits s" is less than or equal to the number of bits n of random number Ur. Tag generation unit 25 then supplies verification tag T1 to comparison unit 26.

Comparison unit 26 compares verification tag T1 that was supplied from tag generation unit 25 and tag Tr that was supplied from input unit 21 and supplies the comparison result to output unit 27.

When the result of comparison by comparison unit 26 indicates that verification tag T1 and tag Tr are the same, output unit 27 supplies information indicating that message Mr was sent from a legitimate sender.

On the other hand, when the result of comparison by comparison unit 26 shows that verification tag T1 and tag Tr are different, output unit 27 supplies information indicating that message Mr was not sent from a legitimate sender. Examples of output unit 27 that can be offered include a computer display or printer.

Figure 5:
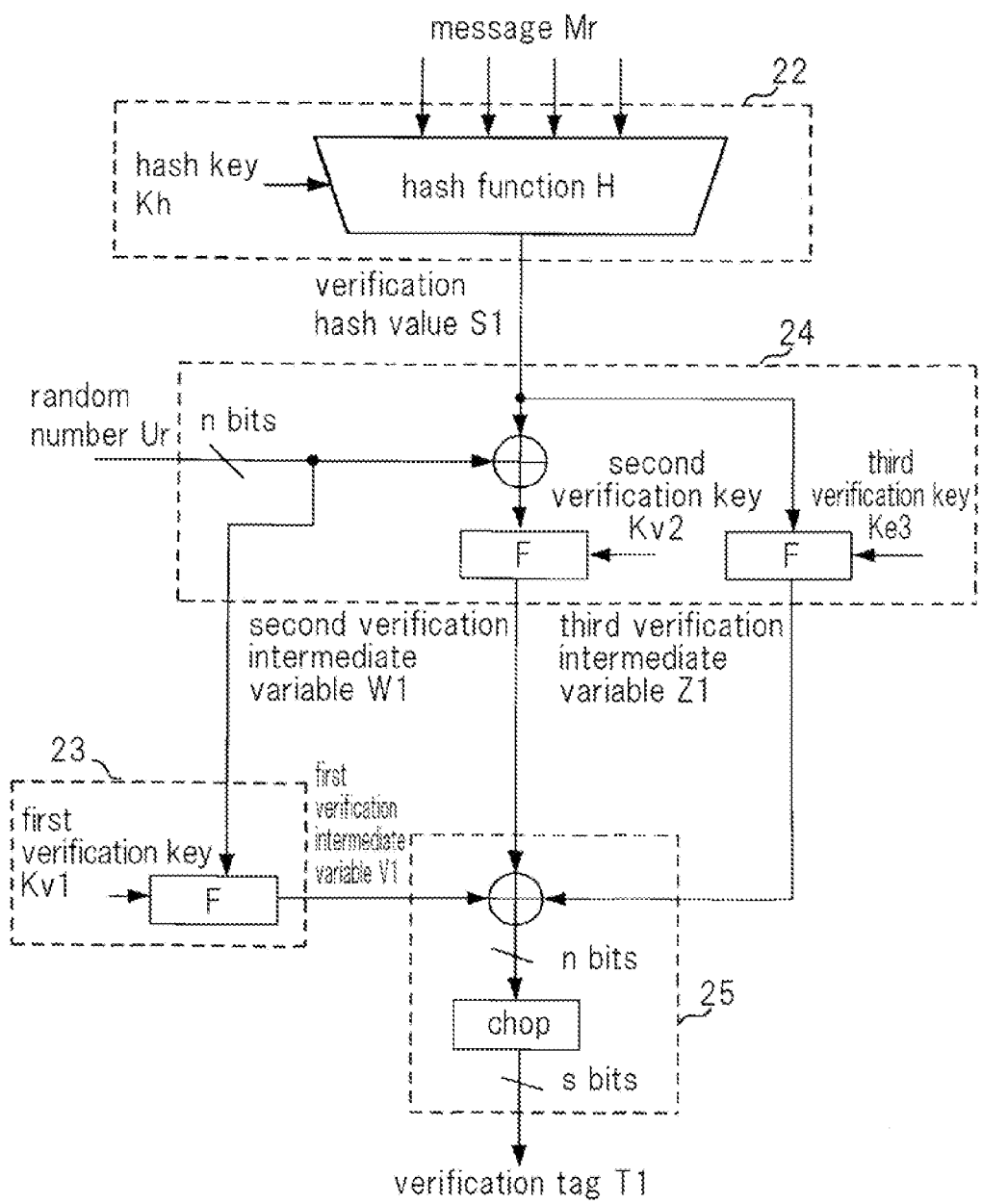
FIG. 5 shows one form of the configuration of the hash unit, random number encryption unit, masked encryption unit, and tag generation unit shown in FIG. 4.

Hash unit 22, random number encryption unit 23, masked encryption unit 24, and tag generation unit 25 shown in FIG. 4 can be realized by the form of the configuration shown in FIG. 5.

The operations of generating tag T by tag generation apparatus 1 of the first exemplary embodiment having the above-described configuration are next described with reference to FIG. 6.

Figure 6:
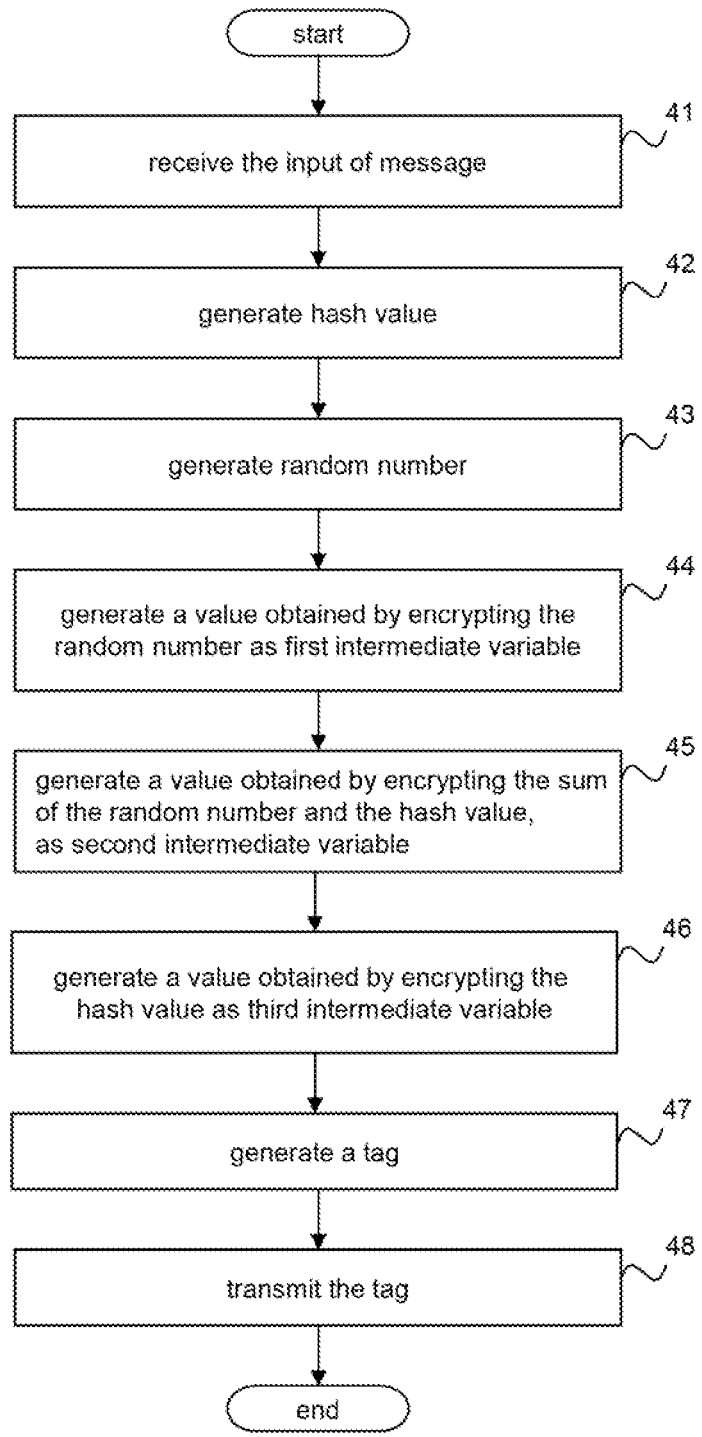
FIG. 6 is a flow chart showing the operations by which the tag generation apparatus of the first exemplary embodiment generates a tag.

In Step 41 shown in FIG. 6, input unit 11 first receives the input of message M from the outside, whereupon input unit 11 reports the reception of the input of message M from the outside to random number generation unit 13. In addition, input unit 11 supplies this message M to hash unit 12 and output unit 17.

In Step 42, hash unit 12 then generates, as hash value S, a value obtained by applying keyed hash function H having hash key Kh to message M that was supplied from input unit 11. Hash unit 12 then supplies this hash value S to masked encryption unit 15.

When notified from input unit 11 that the input of message M has been received from the outside, random number generation unit 13 in Step 43 generates random number U in which the number of bits is n bits that is independent of message M. Random number generation unit 13 then supplies random number U to random number encryption unit 14 and masked encryption unit 15.

Random number encryption unit 14 then, in Step 44, generates intermediate variable V in which the number of bits is n bits by encrypting random number U that was supplied from random number generation unit 13 by encryption function F having first key Ke1. Random number encryption unit 14 then supplies first intermediate variable V to tag generation unit 16.

In Step 45, masked encryption unit 15 computes the exclusive OR of random number U that was supplied from random number generation unit 13 and hash value S that was supplied from hash unit 12. Masked encryption unit 15 then generates, as second intermediate variable W, a value obtained by encrypting the exclusive OR of random number U and hash value S by encryption function F having second key Ke2. Masked encryption unit 15 then supplies second intermediate variable W to tag generation unit 16.

In Step 46, masked encryption unit 15 further generates, as third intermediate variable Z, a value obtained by using encryption function F having third key Ke3 to encrypt hash value S that was supplied from hash unit 12. Masked encryption unit 15 then supplies third intermediate variable Z to tag generation unit 16.

Tag generation unit 16 then computes the exclusive OR of first intermediate variable V that was supplied from random number encryption unit 14 and second intermediate variable W and third intermediate variable Z that were supplied from masked encryption unit 15. In Step 47, tag generation unit 16 next generates, as tag T, bits of a predetermined number of bits s that are extracted from among the exclusive OR of first intermediate variable V, second intermediate variable W, and third intermediate variable Z. Tag generation unit 16 then supplies tag T to output unit 17.

Output unit 17 subsequently links random number U that was supplied from random number generation unit 13, tag T that was supplied from tag generation unit 16, and message M that was supplied from input unit 11. In Step 48, output unit 17 transmits random number U, tag T, and message M that are linked to tag verification apparatus 2 that is the destination of message M, whereupon the series of operations by which tag generation apparatus 1 generates tag T is completed.

The operations by which tag verification apparatus 2 of the first exemplary embodiment having the above-described configuration verifies tag Tr that is supplied from the outside are next described with reference to FIG. 7.

Figure 7:
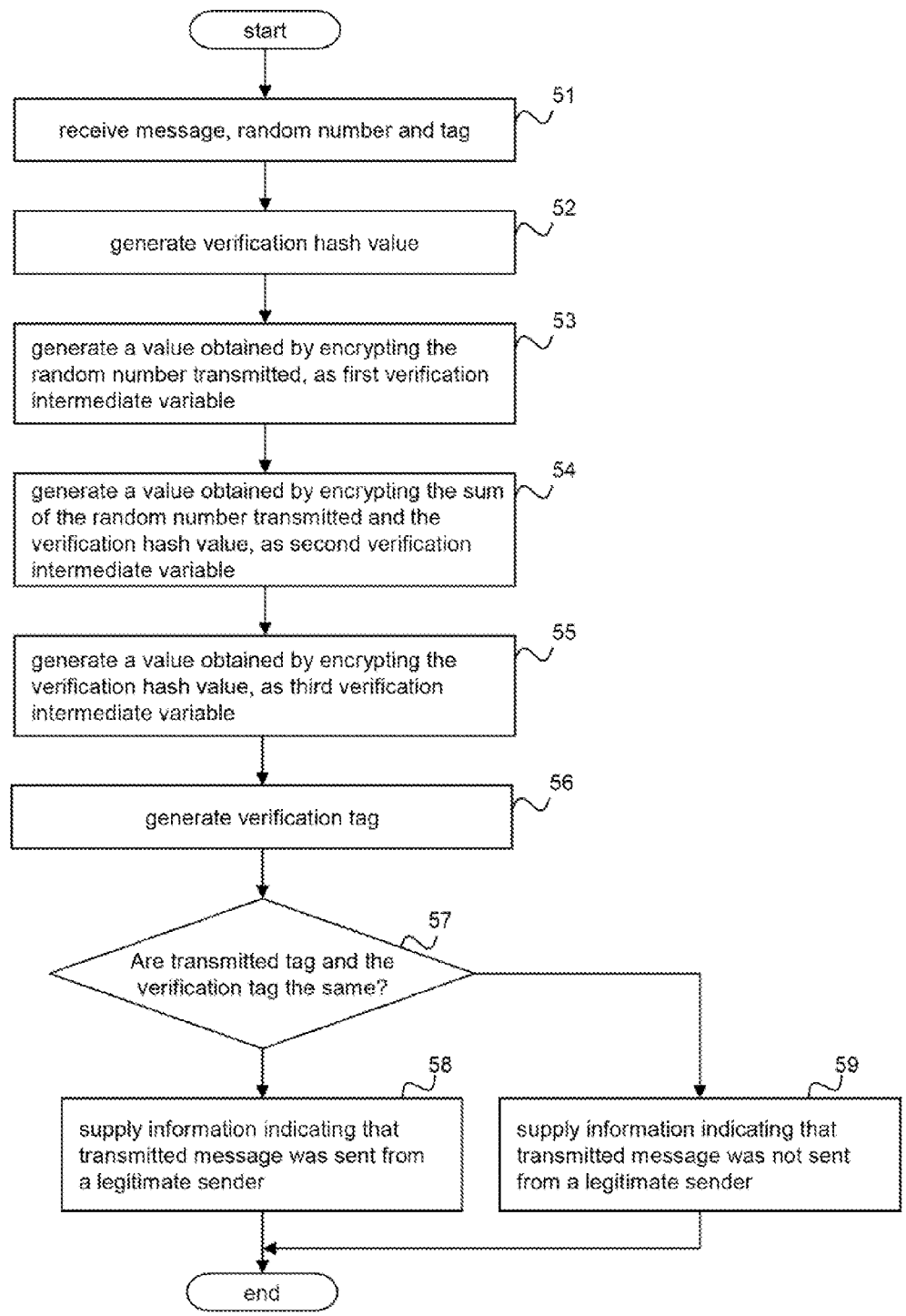
FIG. 7 is a flow chart showing the operations by which the tag verification apparatus of the first exemplary embodiment verifies a tag that was transmitted in from the outside.

In Step 51 shown in FIG. 7, input unit 21 receives message Mr, random number Ur, and tag Tr that are transmitted in by way of communication channel 3 from any transmission origin that includes tag generation apparatus 1. Input unit 21 then supplies this message Mr to hash unit 22. In addition, input unit 21 supplies this random number Ur to random number encryption unit 23. Input unit 21 further supplies this tag Tr to comparison unit 26.

In Step 52, hash unit 22 thereupon generates, as verification hash value S1, a value obtained by applying keyed hash function H having hash key Kh to message Mr that was supplied from input unit 21. Hash unit 22 then supplies verification hash value S1 to masked encryption unit 24.

In Step 53, random number encryption unit 23 further generates first verification intermediate variable V1 in which the number of bits is n bits by encrypting random number Ur that was supplied from input unit 21 by encryption function F having first verification key Kv1. Random number encryption unit 23 then supplies first verification intermediate variable V1 to tag generation unit 25.

Masked encryption unit 24 next computes the exclusive OR of random number Ur that was supplied from input unit 21 and verification hash value S1 that was supplied from hash unit 22. In Step 54, masked encryption unit 24 next generates, as second verification intermediate variable W1, a value obtained by encrypting the exclusive OR of random number Ur and verification hash value S1 by encryption function F having second verification key Kv2. Masked encryption unit 24 then supplies second verification intermediate variable W to tag generation unit 25.

In Step 55, masked encryption unit 24 further generates, as third verification intermediate variable Z1, a value obtained by using encryption function F having third verification key Kv3 to encrypt verification hash value S1 that was supplied from hash unit 22. Masked encryption unit 24 then supplies third verification intermediate variable Z1 to tag generation unit 25.

Tag generation unit 25 then computes the exclusive OR of first verification intermediate variable V1 that was supplied from random number encryption unit 23 and second verification intermediate variable W1 and third verification intermediate variable Z1 that were supplied from masked encryption unit 24.

In Step 56, tag generation unit 25 then generates, as verification tag T1, bits of a predetermined number s that are extracted from among the exclusive OR of first verification intermediate variable V1, second verification intermediate variable W1, and third verification intermediate variable Z1. Tag generation unit 25 then supplies verification tag T1 to comparison unit 26.

In Step 57, comparison unit 26 then compares verification tag T1 that was supplied from tag generation unit 25 and tag Tr that was supplied from input unit 21 and supplies the comparison result to output unit 27.

If this comparison result indicates that verification tag T1 and tag Tr are the same, output unit 27 in Step 58 supplies information indicating that message Mr was sent from a legitimate sender.

On the other hand, if the result of comparison in Step 57 shows that verification tag T1 and tag Tr are different, output unit 27 in Step 59 supplies information indicating that message Mr was not sent from a legitimate sender. This completes the series of operations by which tag verification apparatus 2 of the first exemplary embodiment verifies tag Tr that was transmitted in from the outside.

According to the first exemplary embodiment of the present invention as described hereinabove, tag generation apparatus 1 computes the exclusive OR of hash value S in which the number of bits is n bits that is obtained by applying keyed hash function H to message M and random number U in which the number of bits is n bits. Tag generation apparatus 1 then generates second intermediate variable W by using encryption function F that receives as input data of n bits and supplies as output data of n bits (for example, n-bit block code) to encrypt the value of this exclusive OR. The exclusive OR of first intermediate variable V that was obtained by using encryption function F to encrypt random number U, third intermediate variable Z and second intermediate variable W that were obtained by using encryption function F to encrypt hash value S is then generated as tag T.

Tag T (message authentication code) that is generated by means of this method, in contrast to a tag that is generated in the Carter-Wegman MAC method, does not lead to disclosure of hash key Kh belonging to hash function H, even when a plurality of random numbers generated by random number generation unit 13 match each other.

This method enables a major improvement in safety against chosen plaintext attacks, resulting in a major increase in the number of communications that can be carried out safely by one key compared to a typical method. The first exemplary embodiment can further both avoid an increase in the amount of communication and mitigate an increase in the amount of computation compared to a typical method.

In addition, according to the first exemplary embodiment, not only can a key lifetime (KLT) be made longer than "n/2," but the number of bits of random number U is the same as the number of bits (=n bits) of a random number that is used in a method such as Carter-Wegman MAC in which the key lifetime is "n/2." As a result, a tag T with a random number can be generated efficiently.

This is because in the first exemplary embodiment, random number U is interposed in both of first intermediate variable V and second intermediate variable W that are used in generating tag T. As a result, based on the difference of hash values S that are supplied from hash function H, the easy inference of hash key Kh that is used in the generation of this hash value S can be made complex even when random numbers U coincide (conflict).

In randomized CW-MAC, the difference in hash values is revealed when random numbers coincide, whereby hash key Kh of hash function H that is used in the generation of hash values S can be derived. As a result, the generation of forged data becomes possible in the sense of strong unforgeability for any message M. When the number of bits of random number U is n bits, the probability that random numbers U will be the same in the content of two different instances of communication is approximately $(Qmac^2)/2^n$. As a result, when the value of Qmac is $2^{(n/2)}$ (i.e., when a third party that is carrying out an attack acquires Qmac items of data (random number U, tag T, and message M) that are transmitted from tag generation apparatus 1), there is a possibility that random numbers U will be identical at least one time.

On the other hand, recognition by a third party through observation that hash values that are generated for each of different messages are the same (when the number of bits of hash values S is n bits, there is a possibility that hash values will be identical at least one time when the value of Qmac is $2^{(n/2)}$) will immediately lead to an attack (the generation and transmission of forged data).

According to the first exemplary embodiment, however, even when hash values S are the same, hash key Kh cannot be easily inferred by a third party and safety can be maintained as long as random numbers U are not identical. More specifically, it is shown that KLT will be substantially at least "⅔n" through the proper selection of a universal hash function. This represents a drop in safety compared to the key lifetime (KLT) in the art recited in Non-Patent Document 1 in which the value is substantially n. However, because KLT is an evaluation index represented by the exponent when the maximum value (key lifetime) of the number of times message M can be transmitted by one particular key is expressed as a power of two, the key lifetime can be made far longer than KLT (="n/2") in randomized CW-MAC that is realized by typical n-bit random numbers.

According to the first exemplary embodiment, not only is the number of bits of random number U less than the method disclosed in Non-Patent Document 1, but the number of times computation is carried out using encryption function F is less than the number of times in the method disclosed in Non-Patent Document 1. As a result, the amount of random numbers U can be reduced without a great increase in the amount of computation that is executed by tag generation apparatus 1 to generate tag T, and consequently, overhead in the communication band can be reduced. This difference in efficiency is particularly significant when the data length of message M is relatively short (for example, for packets that are transferred on communication channel 3 that includes the Internet).

Second Exemplary Embodiment

The communication system of the second exemplary embodiment is next described.

The configuration of the communication system of the second exemplary embodiment is identical to the configuration of the communication system shown in FIG. 1.

The configuration of tag generation apparatus 1 of the second exemplary embodiment is also identical to the configuration of tag generation apparatus 1 shown in FIG. 2.

However, in the second exemplary embodiment, the point that masked encryption unit 15 does not generate third intermediate variable Z differs from the first exemplary embodiment. In other words, masked encryption unit 15 of the second exemplary embodiment generates, as second intermediate variable W, a value obtained by using encryption function F having second key Ke2 to encrypt the exclusive OR of random number U that was supplied from random number generation unit 13 and hash value S that was supplied from hash unit 12 and supplies second intermediate variable W as output to tag generation unit 16.

Tag generation unit 16 of the second exemplary embodiment computes the exclusive OR of first intermediate variable V that was supplied from random number encryption unit 14 and second intermediate variable W that was supplied from masked encryption unit 15. Tag generation unit 16 then generates, as tag T, a value contained in bits of a predetermined number of bits s that is less than or equal to the number of bits n of random number U and that are extracted from among exclusive OR of first intermediate variable V and second intermediate variable W and supplies tag T as output to output unit 17.

Figure 8:
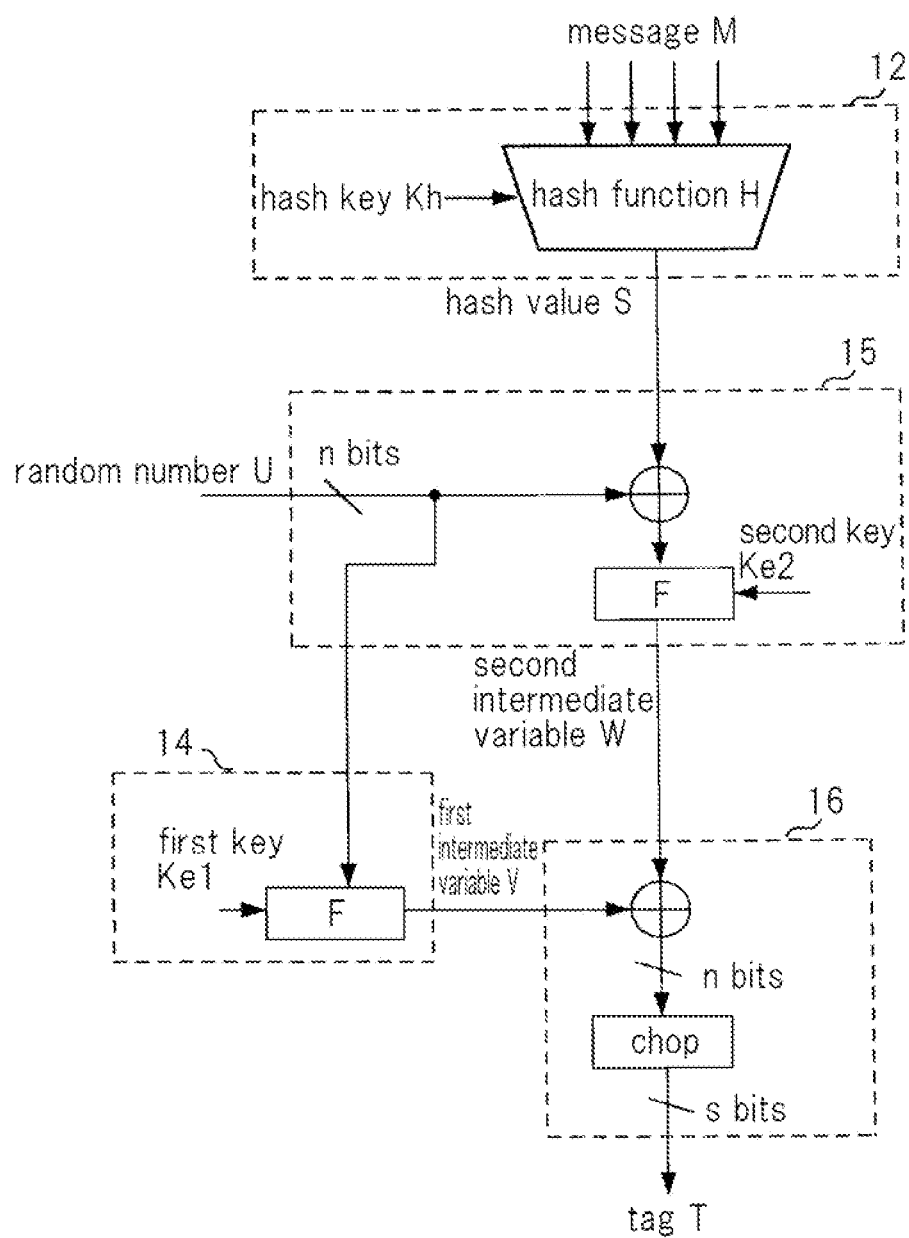
FIG. 8 shows one form of the configuration of the hash unit, random number encryption unit, masked encryption unit, and tag generation unit belonging to the tag generation apparatus of the second exemplary embodiment.
Figure 9:
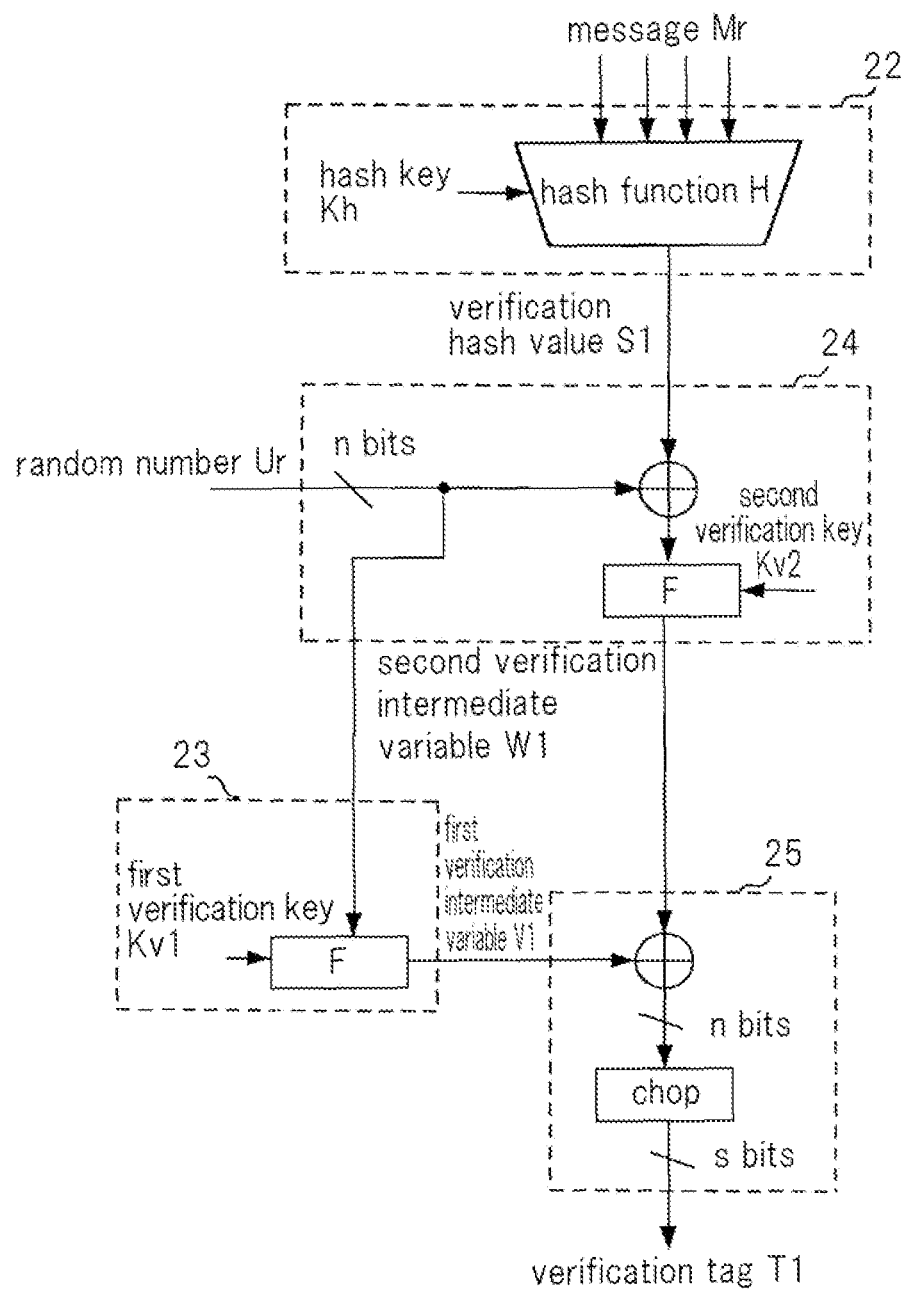
FIG. 9 shows one form of the configuration of the hash unit, random number encryption unit, masked encryption unit, and tag generation unit belonging to the tag verification apparatus of the second exemplary embodiment.

Hash unit 12, random number encryption unit 14, masked encryption unit 15, and tag generation unit 16 of the second exemplary embodiment can be realized by the form of the configuration shown in FIG. 8.

In addition, the configuration of tag verification apparatus 2 of the second exemplary embodiment is identical to the configuration of tag verification apparatus 2 shown in FIG. 4.

However, the second exemplary embodiment differs from the first exemplary embodiment in that masked encryption unit 24 does not generate third verification intermediate variable Z1. In other words, masked encryption unit 24 of the second exemplary embodiment computes the exclusive OR of random number Ur that was supplied from input unit 21 and verification hash value S1 that was supplied from hash unit 22. Masked encryption unit 24 then generates, as second verification intermediate variable W1, a value obtained by encrypting the exclusive OR of random number Ur and verification hash value S1 by means of encryption function F having second verification key Kv2 and supplies second verification intermediate variable W1 as output to tag generation unit 25.

In addition, tag generation unit 25 of the second exemplary embodiment computes the exclusive OR of first verification intermediate variable V1 that was supplied from random number encryption unit 23 and second verification intermediate variable W1 that was supplied from masked encryption unit 24. Tag generation unit 25 then generates, as verification tag T1, a value that is contained in bits of a predetermined number of bits s that is equal to or less than the number of bits n of random number Ur and that are extracted from among the exclusive OR of first verification intermediate variable V1 and second verification intermediate variable W1 and supplies verification tag T1 as output to comparison unit 26.

Comparison unit 26 belonging to the tag verification apparatus of the second exemplary embodiment compares verification tag T1 that was generated based on the exclusive OR of first verification intermediate variable V1 and second verification intermediate variable W1 with tag Tr that was supplied from input unit 21.

If, as a result of comparison, verification tag T1 is identical to tag Tr, output unit 27 supplies information indicating that message Mr was sent from a legitimate sender, but if as a result of comparison, verification tag T1 differs from tag Tr, output unit 27 supplies information indicating that message Mr was not sent from a legitimate sender.

As described in the foregoing explanation, according to the second exemplary embodiment of the present invention, random number U is interposed in both of first intermediate variable V and second intermediate variable W that are used in the generation of tag T. As a result, even when random numbers U coincide (conflict), based on the difference in hash values that are supplied from hash function H, the ready inference of hash key Kh that is used in the generation of the hash values can be made more difficult.

In the present invention, the processing in tag generation apparatus 1 may also be realized by, in addition to a form realized by dedicated hardware that was described hereinabove, recording a program for realizing these functions on a recording medium that can be read by a computer that can be caused to operate as tag generation apparatus 1 and then causing the program that was recorded on this recording medium to be read and executed by the computer. The recording medium that can be read to a computer that can be caused to operate as tag generation apparatus 1 refers to a recording medium that can be removably installed such as a floppy disk (registered trademark), a magneto-optical disk, a DVD, or CD, or to an HDD that is incorporated in the computer. The program that is recorded on this recording medium is, for example, read to a processor that operates as hash unit 12, random number generation unit 13, random number encryption unit 14, masked encryption unit 15, and tag generation unit 16, and that belongs to the computer that is caused to operate as tag generation apparatus 1, and processing equivalent to that described hereinabove is carried out by the control of the processor.

Here, the processor that operates as hash unit 12, random number generation unit 13, random number encryption unit 14, masked encryption unit 15, and tag generation unit 16 executes the program that is read from the recording medium on which the program has been recorded. The above-described program can be similarly applied for tag verification apparatus 2.

The present invention can also be applied to such purposes as the authentication of data that are transmitted and received in communication carried out by a radio communication method or wired communication method, or can be applied to the purpose of preventing the alteration of data that are stored in a storage device.

As an exemplary advantage according to the invention, tags for message authentication having a high level of safety can be efficiently generated.

Although the invention of the present application has been described hereinabove with reference to exemplary embodiments, the invention of the present application is not limited to the above-described exemplary embodiments. The constitution and details of the invention of the present application are open to various modifications within the scope of the invention of the present application that will be clear to one of ordinary skill in the art.

This application incorporates by citation all of the disclosures of Japanese Patent Application No. 2009-114504 for which application was submitted on May 11, 2009 and claims the benefits of priority based on that application.

EXPLANATION OF REFERENCE NUMBERS 1 tag generation apparatus
2 tag verification apparatus
3 network
11 input unit
12 hash unit
13 random number generation unit
14 random number encryption unit
15 masked encryption unit
16 tag generation unit
17 output unit
21 input unit
22 hash unit
23 random number encryption unit
24 masked encryption unit
25 tag generation unit
26 comparison unit
27 output unit

The invention claimed is:

1. A tag generation apparatus that adds, to a message for which input was received from the outside, a tag for distinguishing whether or not the message has been altered, comprising:

a processor operating as a hash unit, a random number generation unit, a random number encryption unit, a masked encryption unit, and a tag generation unit by executing a program; and
an output unit,
wherein:
said hash unit generates, as a hash value, a value obtained by applying a predetermined hash function to said message;
said random number generation unit, when input of said message is received from the outside, generates a random number that is independent of the message;
said random number encryption unit generates, as a first intermediate variable, a value obtained by applying an encryption function having a first key to said random number;
said masked encryption unit generates, as a second intermediate variable, a value obtained by applying said encryption function having a second key to the exclusive OR of said random number and said hash value;
said tag generation unit generates, as said tag, a value that is contained in bits of a predetermined number of bits that is less than or equal to the number of bits of said random number that are extracted from among the exclusive OR of said first intermediate variable and said second intermediate variable;

said output unit transmits said message, said random number, and said tag to the destination of the message; and said masked encryption unit, together with generating said second intermediate variable, generates as a third intermediate variable, a value obtained by applying said encryption function having a third key to said hash value.

2. The tag generation apparatus according to claim 1, wherein said hash unit generates, as said hash value, a value obtained by applying a keyed hash function having a hash key to said message.

3. A tag verification apparatus that verifies a message that is transmitted in from the outside by using a tag to distinguish whether or not the message has been altered, comprising:

a processor operating as a hash unit, a random number encryption unit a masked encryption unit, a tag generation unit and a comparison unit by executing a program, wherein:

said hash unit generates, as a verification hash value, a value that is obtained by applying a predetermined hash function to said message;

said random number encryption unit generates, as a first verification intermediate variable, a value obtained by applying an encryption function having a first verification key to a random number that was transmitted in together with said message;

said masked encryption unit generates, as a second verification intermediate variable, a value obtained by applying said encryption function having a second verification key to the exclusive OR of said random number and said verification hash value;

said tag generation unit generates, as a verification tag, a value that is contained in bits of a predetermined number of bits that is less than or equal to the number of bits of said random number that are extracted from among the exclusive OR of said first verification intermediate variable and said second verification intermediate variable;

said comparison unit compares said verification tag and said tag that was transmitted in from the outside together with said message, said mask encryption unit not only generates said second verification intermediate variable but also generates, as third verification intermediate variable, a value obtained by applying said encryption function having a third verification key to said verification hash value; and said tag generation unit, generates, as said verification tag, a value that is contained in bits of said predetermined number of bits that are extracted from among the exclusive OR of said first verification intermediate variable, said second verification intermediate variable, and said third verification intermediate variable.

4. The tag verification apparatus according to claim 3, wherein said hash unit generates, as said verification hash value, a value that is obtained by applying a keyed hash function having a hash key to said message.

5. The tag verification apparatus according to claim 3, further comprising an output unit that when, as a result of said comparison, said verification tag and said tag that was transmitted in from the outside are identical, supplies information indicating that said message that was transmitted in was transmitted from a legitimate sender, and that when, as a result of said comparison, said verification tag and said tag that was transmitted in from the outside are different, supplies information indicating that said message that was transmitted in was not sent from a legitimate user.

6. A communication system having a tag generation apparatus that adds, to a message for which input was received from the outside, a tag for distinguishing whether or not the message has been altered and a tag verification apparatus that uses said tag to verify said message that was transmitted in from the transmission origin of said message; wherein:

said tag generation apparatus comprises a first processor operating by executing a first program;

said tag verification apparatus comprises a second processor operating by executing a second program;

said tag generation apparatus, by causing said first processor to execute said first program, generates as a hash value a value that is obtained by applying a predetermined hash function to said message; when input of said message is received from the outside, generates a random number that is independent of the message, generates as a first intermediate variable a value that is obtained by applying an encryption function having a first key to said random number, generates as a second intermediate variable a value obtained by applying said encryption function having a second key to the exclusive OR of said random number and said hash value, generates as said tag a value that is contained in bits of a predetermined number of bits that is less than or equal to the number of bits of said random number and that are extracted from among the exclusive OR of said first intermediate variable and said second intermediate variable; and transmits said message, said random number, and said tag to said tag verification apparatus that is the destination of the message; and said tag verification apparatus, by causing said second processor to execute said second program, generates, as a verification hash value, a value that is obtained by applying said hash function to said message that is transmitted in, generates as a first verification intermediate variable a value obtained by applying said encryption function having a first verification key to a random number that was transmitted in together with said message, generates as a second verification intermediate variable a value that is obtained by applying said encryption function having a second verification key to the exclusive OR of said random number that was transmitted in and said verification hash value, generates as a verification tag a value that is contained in bits of said predetermined number of bits that are extracted from among the exclusive OR of said first verification intermediate variable and said second verification intermediate variable, and compares said verification tag and the tag that was transmitted in from the outside together with said message, wherein:

said tag generation apparatus, together with generating said second intermediate variable, generates, as a third intermediate variable, a value that is obtained by applying said encryption function having a third key to said hash value, generates as said tag a value contained in bits of said predetermined number of bits that are extracted from among the exclusive OR of said first intermediate variable, said second intermediate variable, and said third intermediate variable, and transmits said message, said random number, and said tag to said tag verification apparatus that is the destination of said message; and said tag verification apparatus, together with generating said second verification intermediate variable, generates a third verification intermediate variable, a value obtained by applying said encryption function having a third verification key to said verification hash value, and generates, as said verification tag, a value contained in bits of said predetermined number of bits that are extracted from among the exclusive OR of said first verification intermediate variable, said second verification intermediate variable, and said third verification intermediate variable.

7. The communication system according to claim 6, wherein:

said tag generation apparatus generates, as said hash value, a value that is obtained by applying a keyed hash function having a hash key to said message for which input was received from the outside; and said tag verification apparatus generates, as said verification hash value, a value that is obtained by applying said keyed hash function having said hash key to said message that was transmitted in.

8. The communication system according to claim 6, wherein said tag verification apparatus, when as a result of said comparison, said verification tag and said tag that was transmitted in from the outside are identical, supplies information indicating that said message that was transmitted in was sent from a legitimate sender, and when as a result of said comparison, said verification tag and said tag that was transmitted in from the outside are different, supplies information indicating that said message that was transmitted in was not sent from a legitimate sender.

9. A tag generation method that adds, to a message for which input is received from the outside, a tag for distinguishing whether or not the message has been altered, the tag generation method comprising:

a hash process of generating as a hash value a value that is obtained by applying a predetermined hash function to said message;

a random number generation process of, when input of said message is received from the outside, generating a random number that is independent of the message;

a random number encryption process of generating as a first intermediate variable a value that is obtained by applying an encryption function having a first key to said random number;

a masked encryption process of generating as a second intermediate variable a value that is obtained by applying said encryption function having a second key to the exclusive OR of said random number and said hash value;

a tag generation process of generating as said tag a value that is contained in bits of a predetermined number of bits that is less than or equal to the number of bits of the random number and that are extracted from among the exclusive OR of said first intermediate variable and said second intermediate variable;

an output process of transmitting said message, said random number, and said tag to the destination of the message;

in said masked encryption process, together with generating said second intermediate variable, generating as a third intermediate variable a value obtained by applying said encryption function having a third key to said hash value; and in said tag generation process, generating as said tag value contained in bits of said predetermined number of bits that are extracted from among exclusive OR of said first intermediate variable, said second intermediate variable, and said third intermediate variable.

10. The tag generation method according to claim 9, further comprising:

in said hash process, generating as said hash value a value obtained by applying a keyed hash function having a hash key to said message.

11. A tag verification method of verifying a message that is transmitted in from the outside by using a tag to distinguish whether or not the message has been altered, comprising:

a hash process of generating as a verification hash value a value obtained by applying a predetermined hash function to said message;

a random number encryption process of generating as a first verification intermediate variable a value that is obtained by using an encryption function having a first verification key to a random number that was transmitted in together with said message;

a masked encryption process of generating as a second verification intermediate variable a value obtained by applying said encryption function having a second verification key to the exclusive OR of said random number and said verification hash value;

a tag generation process of generating as a verification tag a value contained in bits of a predetermined number of bits that is less than or equal to the number of bits of said random number and that are extracted from among the exclusive OR of said first verification intermediate variable and said second verification intermediate variable;

a comparison process of comparing said verification tag and said tag that was transmitted in from the outside together with said message, in said masked encryption process, together with generating said second verification intermediate variable, generating as a third verification intermediate variable a value obtained by applying said encryption function having a third verification key to said verification hash value; and in said tag generation process, generating as said verification tag a value that is contained in bits of said predetermined number of bits that are extracted from the exclusive OR of said first verification intermediate variable, said second verification intermediate variable, and said third verification intermediate variable.

12. The tag verification method according to claim 11, further comprising:

in said hash process, generating as said verification hash value a value that is obtained by applying a keyed hash function having a hash key to said message.

13. The tag verification method according to claim 11, further comprising:

an output process of, when as a result of said comparison, said verification tag and said tag that was transmitted in from the outside are identical, supplying information indicating that said message that was transmitted in was sent from a legitimate sender, and when as a result of said comparison, said verification tag and said tag that was transmitted in from the outside are different, supplying information indicating that said message that was transmitted in was not sent from a legitimate sender.

14. A non-transitory computer-readable recording medium that records a program that causes a tag generation apparatus, which adds to a message for which input is received from the outside a tag for distinguishing whether or not the message has been altered, to execute:

a hash procedure of generating as a hash value a value obtained by applying a predetermined hash function to said message;

a random number generation procedure of, when input of said message is received from the outside, generating a random number that is independent of said message;

a random number encryption procedure of generating as a first intermediate variable a value obtained by applying an encryption function having a first key to said random number;

a masked encryption procedure of generating as a second intermediate variable a value obtained by applying said encryption function having a second key to the exclusive OR of said random number and said hash value;

a tag generation procedure of generating as said tag a value contained in bits of a predetermined number of bits that is less than or equal to the number of bits of said random number and that are extracted from among the exclusive OR of said first intermediate variable and said second intermediate variable; and an output procedure of transmitting said message, said random number, and said tag to the destination of said message, wherein the program that is recorded further causes:

in said masked encryption procedure, together with generating said second intermediate variable, generation of as a third intermediate variable a value obtained by applying said encryption function having a third key to said hash value; and in said tag generation procedure, generation of as said tag a value that is contained in bits of said predetermined number of bits that are extracted from among exclusive OR of said first intermediate variable, said second intermediate variable, and said third intermediate variable.

15. The non-transitory computer-readable recording medium according to claim 14, wherein the program that is recorded further causes:

in said hash procedure, generation of as said hash value a value that is obtained by applying a keyed hash function having a hash key to said message.

16. A non-transitory computer-readable recording medium that records a program that causes a tag verification apparatus, which verifies a message that is transmitted in from the outside by using a tag to distinguish whether or not the message has been altered, to execute:

a hash procedure of generating as a verification hash value a value that is obtained by applying a predetermined hash function to said message;

a random number encryption procedure of generating as a first verification intermediate variable a value obtained by applying an encryption function having a first verification key to a random number that is transmitted in together with said message;

a masked encryption procedure of generating as a second verification intermediate variable a value that is obtained by applying said encryption function having a second verification key to the exclusive OR of said random number and said verification hash value;

a tag generation procedure of generating as a verification tag a value that is contained in bits of a predetermined number of bits that is less than or equal to the number of bits of said random number and that are extracted from among the exclusive OR of said first verification intermediate variable and said second verification intermediate variable; and a comparison procedure of comparing said verification tag with said tag that is transmitted in from the outside together with said message, wherein the recording medium records a program that causes;

in said masked encryption procedure, together with generating said second verification intermediate variable, generation of a third verification intermediate variable a value obtained by applying said encryption function having a third verification key to said verification hash value; and in said tag generation procedure, generation of as said verification tag a value that is contained in bits of said predetermined number of bits that are extracted from among exclusive OR of said first verification intermediate variable, said second verification intermediate variable, and said third verification intermediate variable.

17. The non-transitory computer-readable recording medium according to claim 16, wherein the program that is recorded further causes:

in said hash procedure, generation of as said verification hash value a value that is obtained by applying a keyed hash function having a hash key to said message.

18. The non-transitory computer-readable recording medium according to claim 16, wherein the program that is recorded further causes said tag verification apparatus to execute:

an output procedure of, when as a result of said comparison, said verification tag and said tag that was transmitted in from the outside are identical, supplying information indicating that said message that was transmitted in was sent from a legitimate sender, and when as a result of said comparison, said verification tag and said tag that was transmitted in from the outside are different, supplying information indicating that said message that was transmitted in from the outside was not sent by a legitimate sender.

* * * * *